(12) United States Patent
Kinoshita et al.

(10) Patent No.: US 11,591,179 B2
(45) Date of Patent: Feb. 28, 2023

(54) MULTI-CORE CABLE CORE ALIGNMENT DEVICE AND MULTI-CORE CABLE CORE ALIGNMENT METHOD

(71) Applicant: Hitachi Metals, Ltd., Tokyo (JP)

(72) Inventors: Takahiro Kinoshita, Tokyo (JP); Shinji Takane, Tokyo (JP); Motoyuki Itoh, Tokyo (JP)

(73) Assignee: HITACHI METALS, LTD, Tokyo (JP)

( * ) Notice: Subject to any disclaimer, the term of this patent is extended or adjusted under 35 U.S.C. 154(b) by 747 days.

(21) Appl. No.: 16/563,318

(22) Filed: Sep. 6, 2019

(65) Prior Publication Data
US 2020/0079612 A1    Mar. 12, 2020

(30) Foreign Application Priority Data

Sep. 12, 2018    (JP) .............................. JP2018-170444
Aug. 9, 2019     (JP) .............................. JP2019-148064

(51) Int. Cl.
*H01B 13/00*    (2006.01)
*H01B 13/012*   (2006.01)
(Continued)

(52) U.S. Cl.
CPC .......... *B65H 57/04* (2013.01); *B65H 57/003* (2013.01); *D07B 7/10* (2013.01); *H01B 13/0036* (2013.01);
(Continued)

(58) Field of Classification Search
CPC .......... H01B 13/0036; H01B 13/01209; H01B 13/01236; H01B 13/01245; H01B 13/016; H02G 1/14
See application file for complete search history.

(56) References Cited

U.S. PATENT DOCUMENTS

| 4,136,440 A | * | 1/1979 | Brandewie | H01R 43/01 29/857 |
| 5,896,644 A | * | 4/1999 | Lucenta | H01R 43/28 29/749 |
| 2003/0196320 A1 | * | 10/2003 | Ikeda | H01R 43/28 29/749 |

FOREIGN PATENT DOCUMENTS

| CN | 1361562 A | 7/2002 |
| CN | 106067646 A | 11/2016 |

(Continued)

OTHER PUBLICATIONS

Office Action issued in the corresponding Chinese Patent Application No. 201910848791.6 dated Feb. 18, 2022.
(Continued)

*Primary Examiner* — Peter Dungba Vo
*Assistant Examiner* — Jose K Abraham
(74) *Attorney, Agent, or Firm* — Thomas W. Cole; Calderon Safran & Cole P.C.

(57) ABSTRACT

A multi-core cable core aligning device is composed of a temporary holding mechanism, which is configured to arrange tips of a plurality of cores exposed at one end of a multi-core cable in a row along a predetermined arranging direction, and temporarily hold each one of the plurality of cores in such a manner as to be movable along the predetermined arranging direction, a transferring mechanism, which is configured to transfer the plurality of cores one by one while separating the plurality of cores held by the temporary holding mechanism one by one from other ones of the plurality of cores, and an aligning mechanism, which is configured to align and hold the plurality of cores with a predetermined space between adjacent ones of the plurality of cores while holding the plurality of cores transferred by the transferring mechanism one by one at spaced intervals.

9 Claims, 22 Drawing Sheets

(51) Int. Cl.
    *H02G 1/14*     (2006.01)
    *H01B 13/016*     (2006.01)
    *B65H 57/04*     (2006.01)
    *D07B 7/10*     (2006.01)
    *B65H 57/00*     (2006.01)

(52) U.S. Cl.
    CPC . *H01B 13/01209* (2013.01); *H01B 13/01236* (2013.01); *H01B 13/01245* (2013.01); *H02G 1/14* (2013.01); *H01B 13/016* (2013.01)

(56) References Cited

FOREIGN PATENT DOCUMENTS

| | | | |
|---|---|---|---|
| JP | H01-309283 A | | 12/1989 |
| JP | H02-215016 A | | 8/1990 |
| JP | H0793175 B2 | * | 11/1990 |
| JP | H0613151 A | * | 1/1994 |
| JP | 3103130 B2 | * | 10/2000 |
| JP | 3195924 B2 | * | 8/2001 |
| JP | 2016-208650 A | | 12/2016 |
| JP | 2017-228449 A | | 12/2017 |

OTHER PUBLICATIONS

Office Action issued in the corresponding Japanese Patent Application No. 2019-148064 dated Nov. 1, 2022; 6 pages.

\* cited by examiner

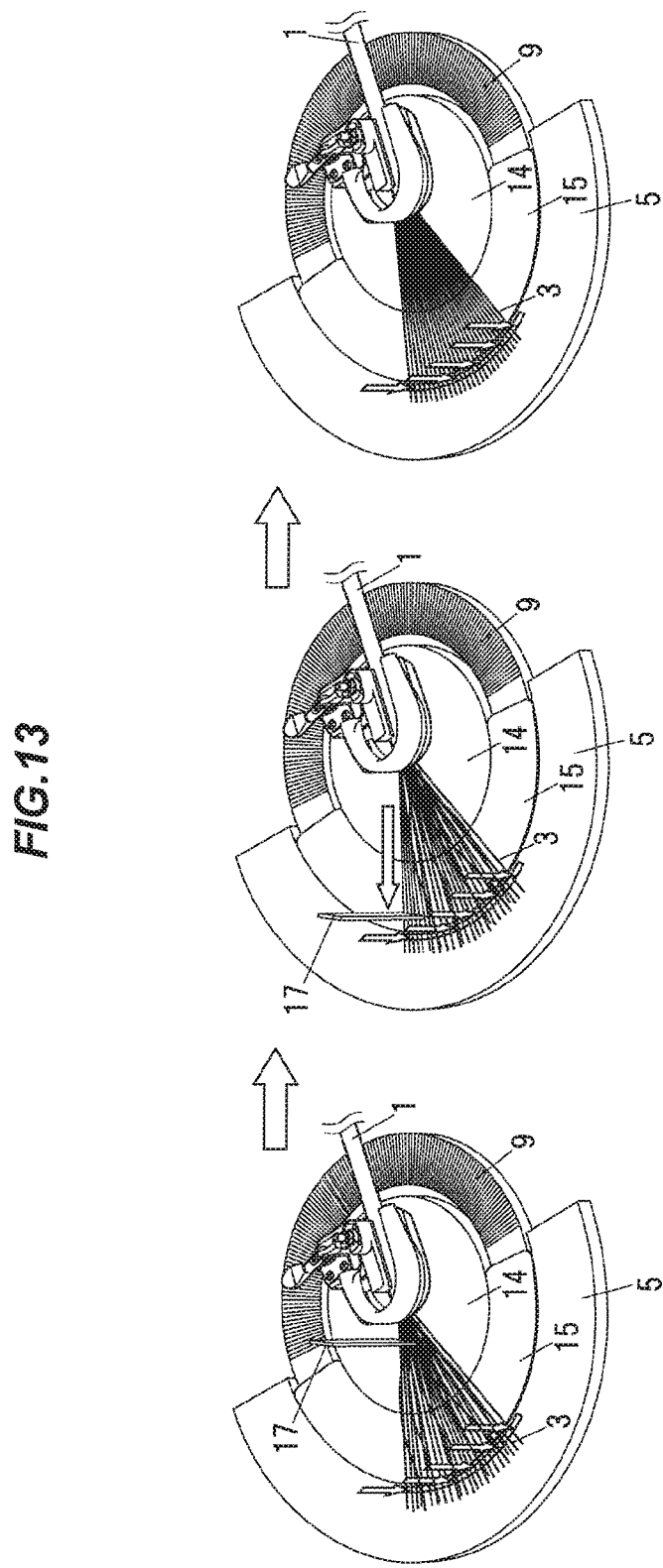

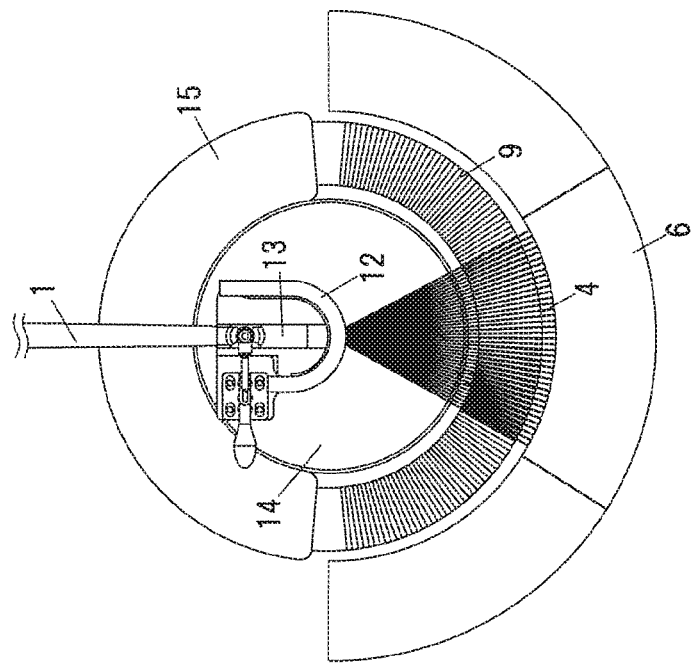
FIG.16
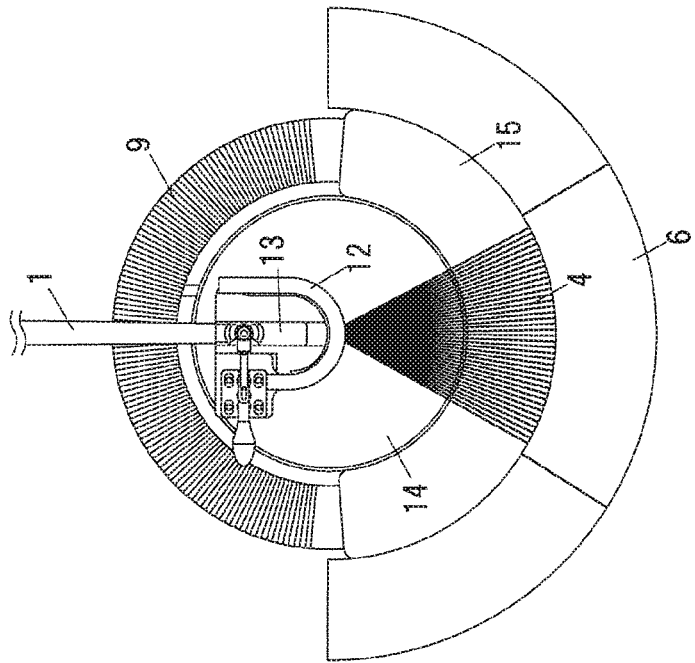

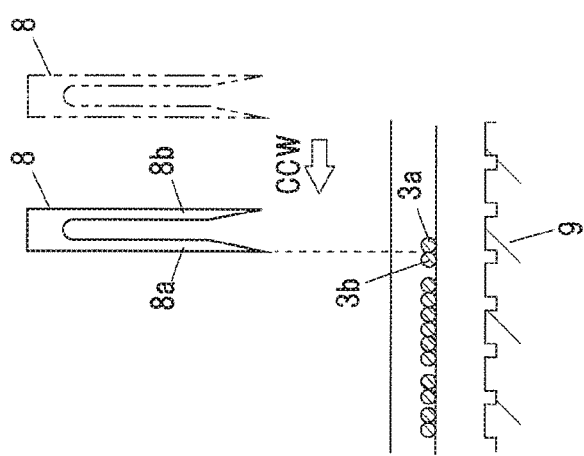
FIG. 22B
FIG. 22C
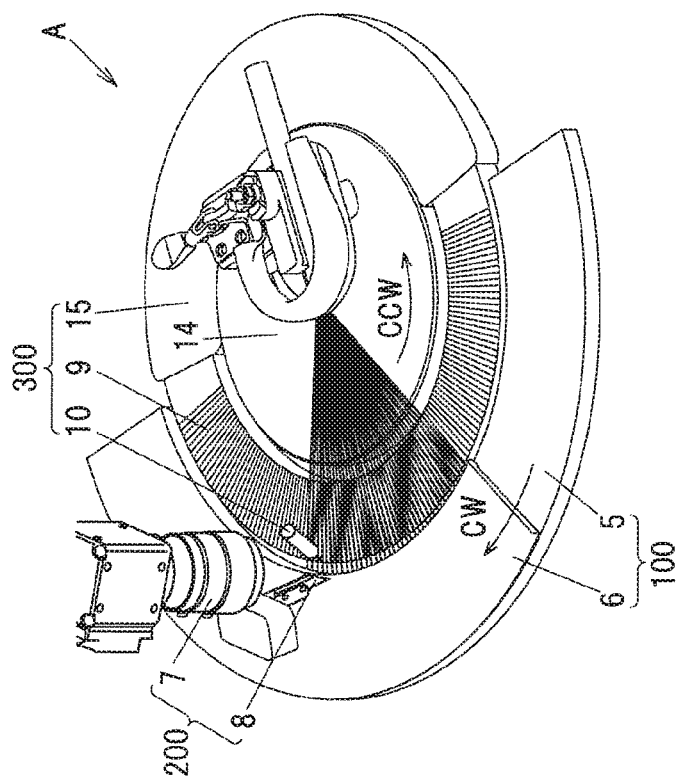
FIG. 22A

MULTI-CORE CABLE CORE ALIGNMENT DEVICE AND MULTI-CORE CABLE CORE ALIGNMENT METHOD

CROSS-REFERENCE TO RELATED APPLICATIONS

The present invention is based on Japanese Patent Application No. 2018-170444 filed on Sep. 12, 2018 and Japanese Patent Application No. 2019-148064 filed on Aug. 9, 2019, the entire contents of which are incorporated herein by reference.

BACKGROUND OF THE INVENTION

1. Field of the Invention

The present invention relates to a multi-core cable core aligning device and a multi-core cable core aligning method.

2. Description of the Related Art

Medical cables include probe cables (for example, for ultrasonic diagnosis), catheter cables, endoscope cables, etc., and in each of them, coaxial cables (also referred to as cores) are used as signal wires. For example, there is an ultrasonic diagnostic probe cable in which 192 coaxial cables are aggregated and a sheath is provided over an outer periphery of that aggregation. For example, see FIG. 4 of JP-A-2017-228449.

When connecting this multi-core coaxial cable to a terminal, it is necessary to perform the terminal connection after checking the electrical continuity between one end and the other end of each coaxial cable. For example, see FIG. 5 of JP-A-2017-228449.

[Patent Document 1] JP-A-2017-228449
[Patent Document 2] JP-A-2016-208650

SUMMARY OF THE INVENTION

This electrical continuity checking is difficult to automate because the coaxial cables for medical use are thin in diameter, and the work of separating and aligning the coaxial cables one by one by hand has conventionally been performed, so there has been a demand for the automation of the work. For example, JP-A-2016-208650 discloses a method for separating and aligning multi-core electric cables one by one. This method uses an electric wire receiving jig formed with a circular arc shape concave surface and an electric wire holding jig formed with a circular arc shape convex surface to sandwich a plurality of electric wire groups therebetween, thereby aligning a plurality of electric wires in a circular arc shape.

However, this method is intended for the electric wire cables for wire harnesses mounted on automobiles, and furthermore, since the thin coaxial medical cables are highly flexible, the thin coaxial medical cables are difficult to separate and align one by one with only the receiving jig and the holding jig.

Accordingly, it is an object of the present invention to provide a multi-core cable core aligning device and a multi-core cable core aligning method that are able to automate such an operation as to separate and align cores of a multi-core cable one by one even when the multi-core cable is a highly flexible multi-core coaxial cable.

A multi-core cable core aligning device of the present invention is configured to include: a temporary holding mechanism, which is configured to arrange tips of a plurality of cores exposed at one end of a multi-core cable in a row along a predetermined arranging direction, and temporarily hold each one of the plurality of cores in such a manner as to be movable along the predetermined arranging direction; a transferring mechanism, which is configured to transfer the plurality of cores one by one while separating the plurality of cores held by the temporary holding mechanism one by one from other ones of the plurality of cores; and an aligning mechanism, which is configured to align and hold the plurality of cores with a predetermined space between adjacent ones of the plurality of cores while holding the plurality of cores transferred by the transferring mechanism one by one at spaced intervals.

Further, in the present invention, it is preferable that the transferring mechanism is configured to include a detecting portion, which is configured to detect one of the plurality of cores being temporarily held by the temporary holding mechanism and lying at an arrangement end, wherein the transferring mechanism transfers the plurality of cores in order from that one of the plurality of cores lying at the arrangement end, on the basis of a detection result detected by that detecting portion.

Further, in the present invention, it is preferable that the transferring mechanism further comprises an inserting tool, which is configured to be inserted between that one of the plurality of cores lying at the arrangement end and one of the plurality of cores lying adjacent to that one of the plurality of cores lying at the arrangement end, wherein the transferring mechanism transfers that one of the plurality of cores lying at the arrangement end by moving that inserting tool.

Further, in the present invention, it is preferable that the aligning mechanism comprises an aligning tool, which is provided with a plurality of grooves with a predetermined pitch, wherein the aligning tool is able to hold the plurality of cores one by one in the plurality of grooves.

Further, in the present invention, it is preferable that the aligning mechanism further comprises a pushing tool, which is configured to push the plurality of cores one by one into the plurality of grooves, wherein the aligning mechanism aligns and holds the plurality of cores, which are in turn being transferred over the plurality of grooves by the transferring mechanism and pushed into the plurality of grooves by the pushing tool.

Further, in the present invention, it is preferable that the multi-core cable core aligning device further comprises a central base, to which the multi-core cable is to be fixed, wherein the aligning tool has a circular arc shape arranged over an outer periphery of the central base, and is configured in such a manner as to be rotatable around the outer periphery of the central base.

Further, in the present invention, it is preferable that the aligning mechanism is configured in such a manner that, during a period of time during which one of the plurality of cores is held in any one of the plurality of grooves and a next one of the plurality of cores is held in the other one of the plurality of grooves adjacent to the one of the plurality of grooves, the aligning mechanism moves the aligning tool in one direction around the outer periphery of the central base by a first predetermined angle, and thereafter moves the aligning tool in the other direction around the outer periphery of the central base by a second predetermined angle smaller than the first predetermined angle.

Further, a multi-core cable core aligning method of the present invention for arranging tips of a plurality of cores exposed at one end of a multi-core cable in a row along a predetermined arranging direction, and align and hold the plurality of cores with a predetermined space between adjacent ones of the plurality of cores, the method comprising: a preliminary setting-up step of arranging the plurality of cores in a row along a predetermined arranging direction, and temporarily holding each one of the plurality of cores in such a manner as to be movable along the predetermined arranging direction; and an aligning step of, with an inserting tool, moving one of the plurality of cores lying at an arrangement end, to thereby separate that one of the plurality of cores from other ones of the plurality of cores, and pushing that one of the plurality of cores into a groove of an aligning tool configured to be able to hold that one of the plurality of cores lying at the arrangement end in that groove.

Further, in the present invention, it is preferable that t the preliminary setting-up step is performed in such a manner as to suck and temporarily hold the tips of the plurality of cores.

Further, in the present invention, it is preferable that the aligning step is performed in such a manner as to optically detect the one of the plurality of cores lying at the arrangement end with a detecting portion.

Further, in the present invention, it is preferable that the aligning tool has a circular arc shape arranged on an outer periphery of a central base, to which the multi-core cable is to be fixed, wherein, in the aligning step, after the one of the plurality of cores lying at the arrangement end is pushed into the groove of the aligning tool, the aligning tool is repeatedly moved around the outer periphery of the central base by a predetermined angle.

Further, in the present invention, it is preferable that the aligning step is performed in such a manner that, during a period of time during which one of the plurality of cores is held in any one of the plurality of grooves and a next one of the plurality of cores is held in the other one of the plurality of grooves adjacent to that one of the plurality of grooves, the aligning tool is moved in one direction around the outer periphery of the central base by a first predetermined angle, and thereafter the aligning tool is moved in the other direction around the outer periphery of the central base by a second predetermined angle smaller than the first predetermined angle.

Points of the Invention

According to the present invention, it is possible to provide the multi-core cable core aligning device and the multi-core cable core aligning method that are able to automate such an operation as to separate and align the cores of the multi-core cable one by one even when the multi-core cable is a highly flexible multi-core coaxial cable for medical use.

BRIEF DESCRIPTION OF THE DRAWINGS

FIG. 12 is a view showing the multi-core cable core aligning device with tips of the cores 3 being sucked by a suction portion 5a;

FIG. 13 is a diagram showing the multi-core cable core aligning device with the cores 3 being arranged in a single layer by using a squeegee 17;

FIG. 16 is a diagram showing the multi-core cable core aligning device with a movement of the aligning tool 9 to a predetermined position;

FIG. 22A is a schematic diagram showing an example of an operation of an aligning mechanism according to a second embodiment and showing a clockwise direction (CW direction) and a counterclockwise direction (CCW direction), which are rotational moving directions of the inserting tool 8 and the aligning tool 9;

FIG. 22B is a schematic diagram illustrating the operation example of the aligning mechanism according to the second embodiment and illustrating the moving of the inserting tool 8 in the counterclockwise direction (CCW direction) when viewed from a central base 14; and FIG. 22C is a schematic diagram showing the operation example of the aligning mechanism according to the second embodiment, and showing the moving of the inserting tool 8 in the clockwise direction (CW direction) and the moving of the aligning tool 9 in the clockwise direction (CW direction) and the counterclockwise direction (CCW direction) when viewed from the central base 14.

DETAILED DESCRIPTION OF THE PREFERRED EMBODIMENTS

First Embodiment

An embodiment of a multi-core cable core aligning device and a multi-core cable core aligning method according to the present invention will be described below with reference to the drawings.

Figure 1A:
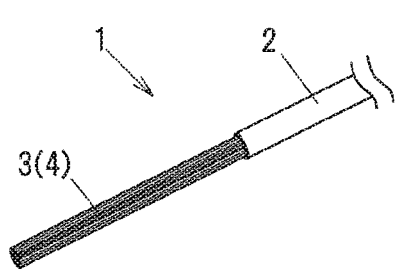
FIG. 1A is an overall view showing one example of a multi-core cable to be aligned according to a first embodiment of the present invention.
Figure 1B:
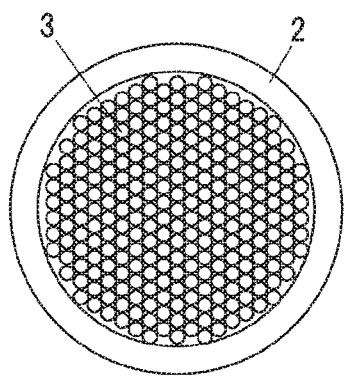
FIG. 1B is an enlarged cross-sectional view showing one example of the multi-core cable to be aligned according to the first embodiment of the present invention.

First, a multicore cable 1 to be aligned according to the present invention will be described. FIGS. 1A and 1B show one example of the multi-core cable 1 to be aligned according to the present invention, where FIG. 1A is an overall view and FIG. 1B is an enlarged cross-sectional view. As shown in FIGS. 1A and 1B, the multi-core cable 1 to be aligned according to the present invention is being covered with a sheath 2 around a plurality of cores 3. Note that the multi-core cable 1 used in the present embodiment has a length of on the order of 3 m and a diameter of on the order of 10 mm, for example, and the plurality of cores 3 lying inside are on the order of 0.3 mm in diameter and are high in flexibility, and the number of the cores 3 is on the order of 200, for example. Further, it is possible to use an insulated electric wire, a coaxial cable and the like as the cores 3, and in the present embodiment, the coaxial cables are being used as the cores 3.

As shown in FIG. 1, the multi-core cable 1 is configured with a constant amount of the sheath 2 being removed from an end portion of the multi-core cable 1 and the tips of the plurality of cores 3 exposed. Further, the plurality of cores 3 constitute an aggregated core cluster 4. The present invention relates to a multi-core cable core aligning device and a multi-core cable core aligning method, whereby the plurality of cores 3 exposed at the tip of the multi-core cable 1 are arranged in a row, aligned and held with a predetermined space therebetween.

Figure 2:
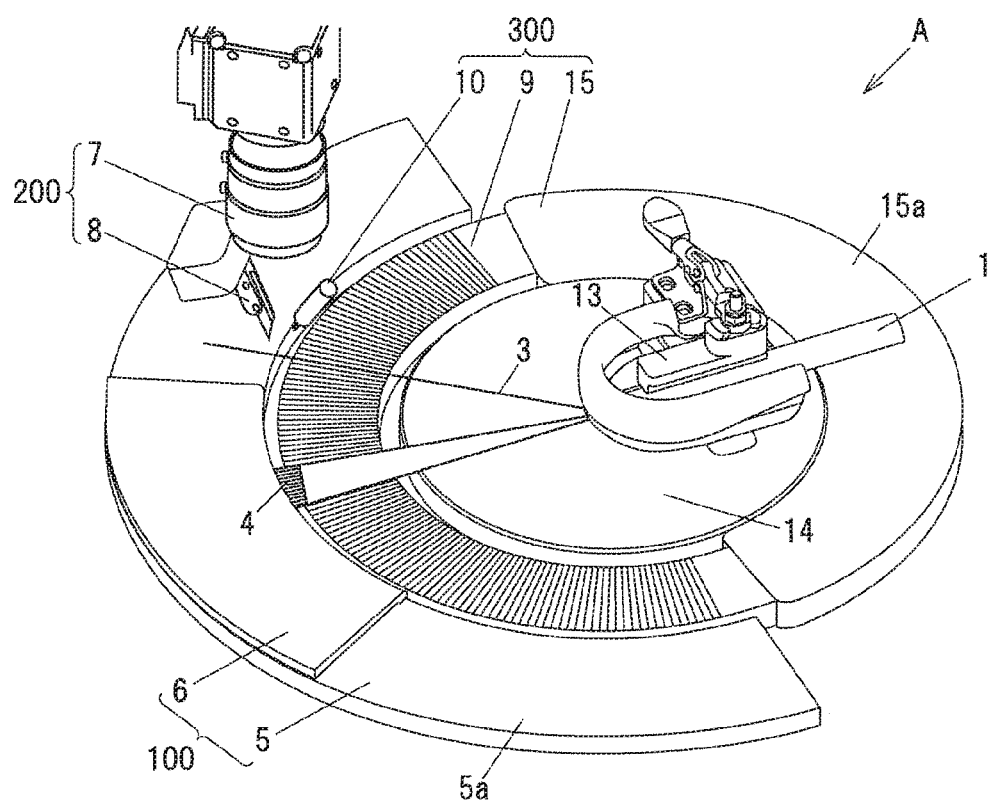
FIG. 2 is a perspective view showing a multi-core cable core aligning device.

Next, a multi-core cable core aligning device A according to an embodiment of the present invention will be described. As shown in FIG. 2, the core aligning device A for the multicore cable 1 in the present embodiment is configured to include a temporary holding mechanism 100, a transferring mechanism 200, and an aligning mechanism 300.

(Temporary Holding Mechanism)

The temporary holding mechanism 100 is configured to temporarily hold the plurality of cores 3 with the plurality of cores 3 being arranged in a row in a single layer with no vertical overlap of the plurality of cores 3. Here, the temporary holding refers to temporarily holding the cores 3 in such a manner as to be able to move the positions of the cores 3 with a relatively small force before the operations with the transferring mechanism 200 and the aligning mechanism 300 are performed.

Figure 3:
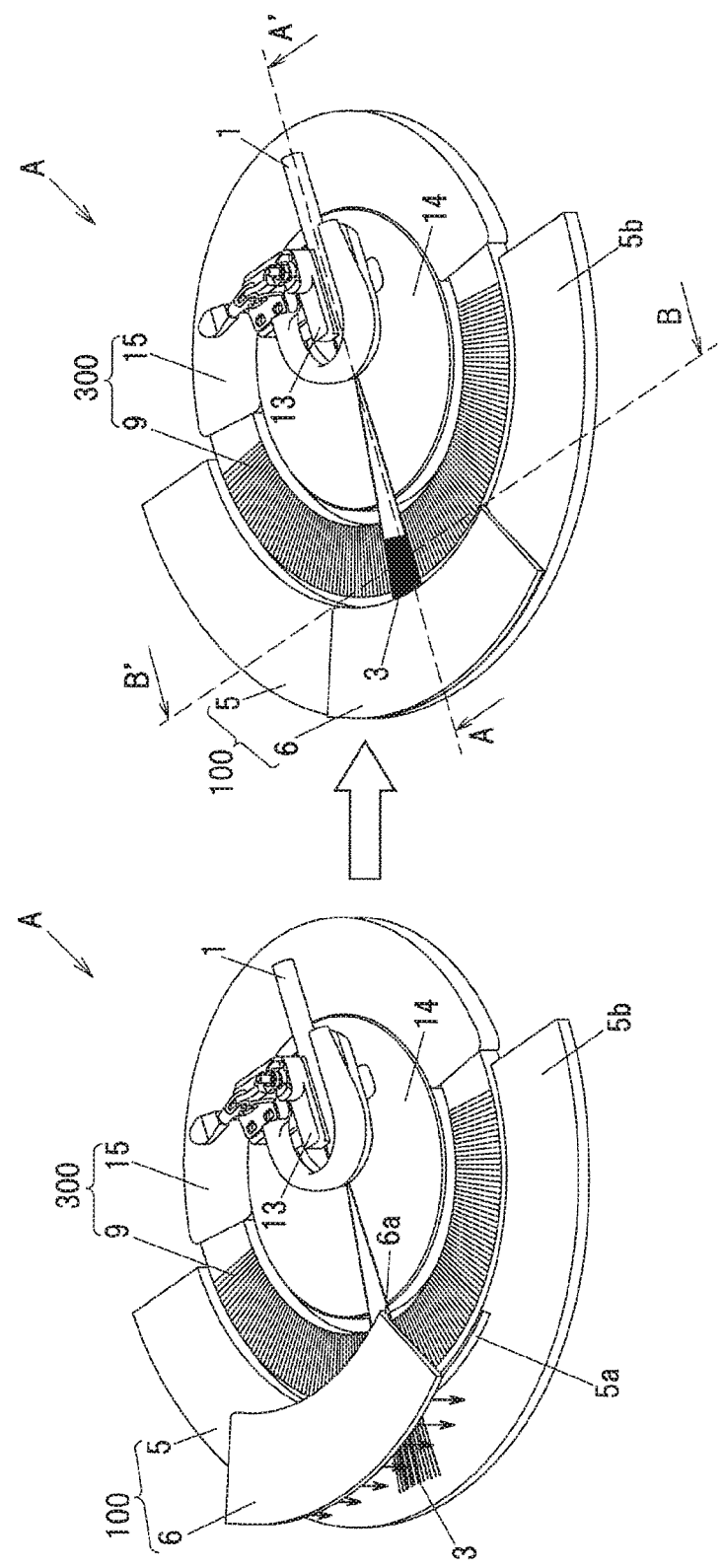
FIG. 3 is a diagram showing a configuration example of a temporary holding mechanism 100.

In the present embodiment, as shown in FIG. 3, the temporary holding mechanism 100 is configured to include a circular arc shape outer peripheral base 5 and a cover 6. The outer peripheral base 5 is being formed in a substantially semicircular shape, while the cover 6 is being formed in a circular arc shape being shorter in length in a circumferential direction than the outer peripheral base 5. The cover 6 is configured to cover a part of the outer peripheral base 5 in the circumferential direction from above in the vertical direction.

The outer peripheral base 5 is being formed with a suction portion 5a that is open upward in the vertical direction. The suction portion 5a is extending in a circular arc shape in a range covered by the cover 6, and is open upward in the vertical direction on an upper surface 5b of the outer peripheral base 5. The suction portion 5a sucks air from the outside, to thereby suck the cores 3 arranged across the suction portion 5a to the outer peripheral base 5.

Figure 4:
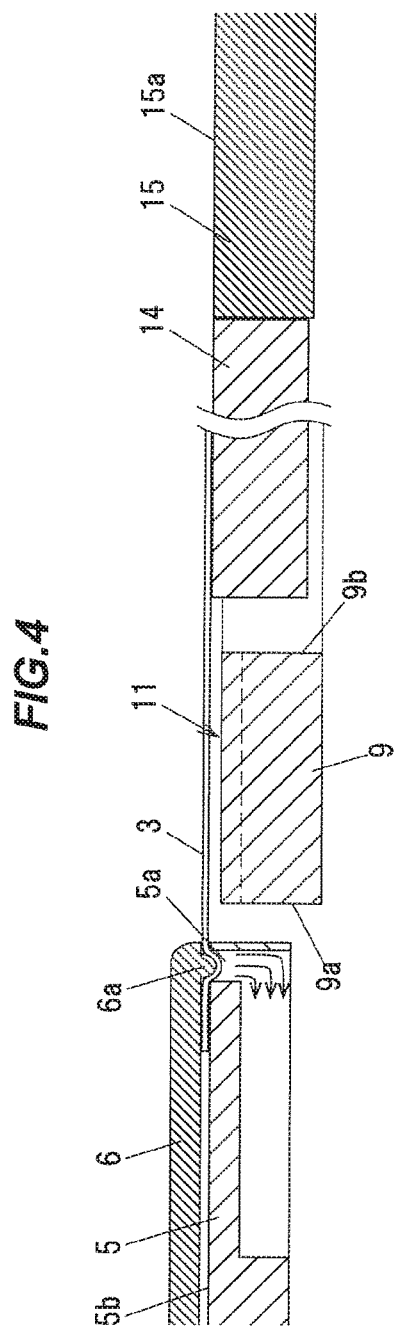
FIG. 4 is a schematic diagram (a cross section view taken along line A-A' in FIG. 3) showing the temporary holding mechanism mounted with a cover 6.

As will be described later, the suction portion Sa allows the plurality of cores 3 to be temporarily held while remaining arranged in a row, and further the cover 6 allows the plurality of cores 3 to be prevented from floating from the outer peripheral base 5. Further, in the present embodiment, as shown in FIG. 4, the cores 3 are held on the suction portion Sa by three-point contact between a tip 6a of the cover 6 and two corners of the suction portion 5a. This results in the temporary holding of the plurality of cores 3.

The tip 6a of the cover 6 is configured to protrude downward in the vertical direction relative to the upper surface 5b of the outer peripheral base 5. By configuring the tip 6a of the cover 6 in this manner, the held cores 3 cannot be moved upward, but when acted on by a constant force, the held cores 3 can be moved in an arranging direction along the outer peripheral base 5 (in the circumferential direction with the center of the circular arc of the outer peripheral base 5 as the center point). Further, it is preferable that the tip 6a of the cover 6 and the outer peripheral base 5 are made of a material having a low frictional resistance, such as a PTFE resin. By configuring the tip 6a of the cover 6 and the outer peripheral base 5 in this manner, the frictional resistance between them and the cores 3 can be made small, so the cores 3 can be moved along the arranging direction with a small force.

(Transferring Mechanism)

Figure 5:
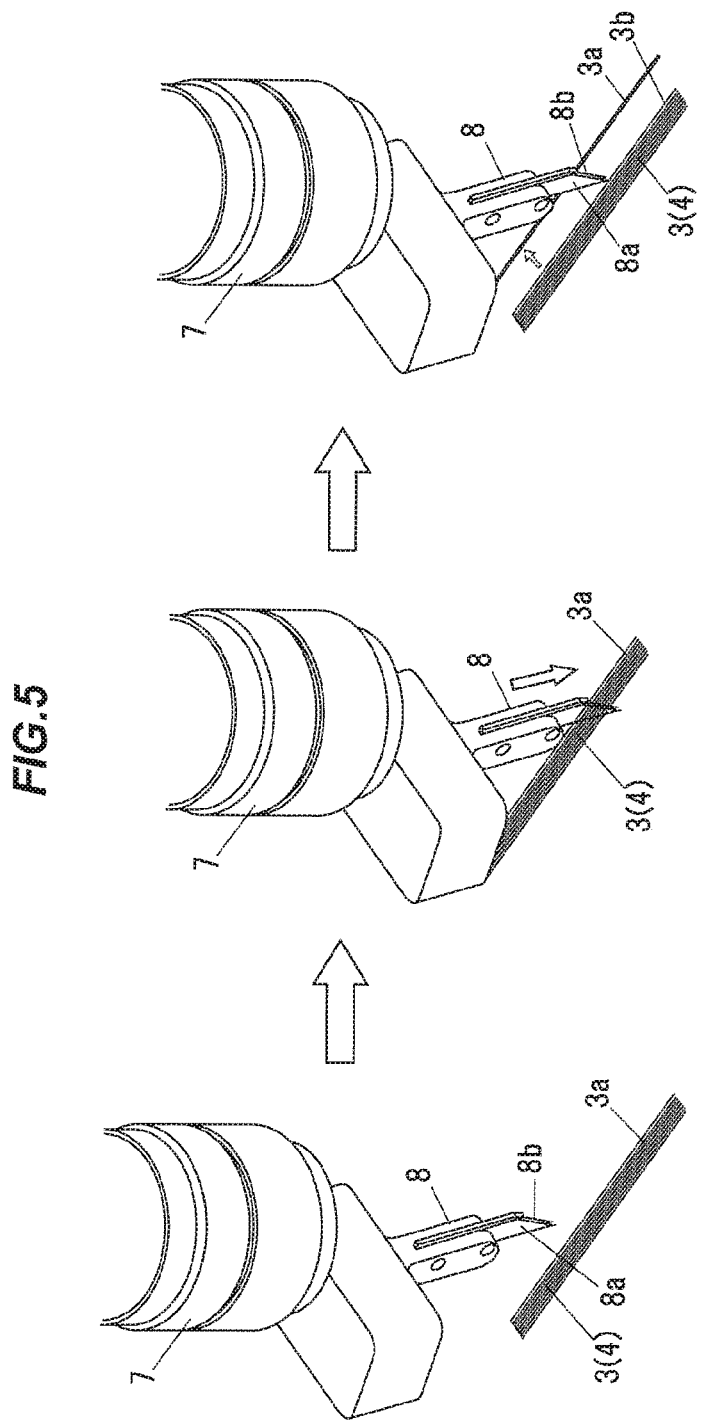
FIG. 5 is a diagram showing a configuration example of a transferring mechanism 200.

The transferring mechanism 200 is configured to, in turn, transfer the plurality of cores 3 temporarily held by the temporary holding mechanism 100 one by one from an arrangement end and along the outer peripheral base 5. As shown in FIG. 5, the transferring mechanism 200 is configured to include a detecting portion 7 that is configured to optically detect a core 3a of the plurality of cores 3 lying at the arrangement end, and an inserting tool 8 that is configured to be inserted between the core 3a and the other cores 3 of the plurality of cores 3. The inserting tool 8 is inserted between the core 3a and a core 3b of the plurality of cores 3 lying adjacent to that core 3a, to separate the core 3a from the core 3b. Further, the inserting tool 8 is being connected to a cylinder (not shown) so as to be movable in upward and downward directions in FIG. 5.

Figure 6:
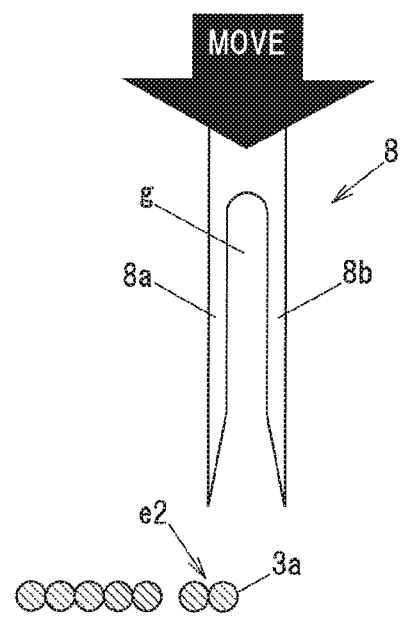
FIG. 6 is a diagram showing a configuration example of an inserting tool 8.

Next, a detailed configuration of the inserting tool 8 will be described with reference to FIG. 6. In the present embodiment, the inserting tool 8 has first and second blades 8a and 8b, and is being formed with a gap g between the first blade 8a and the second blade 8b to allow one core 3 to enter that gap g. In the present embodiment, the width of the gap g is being set at 100% to 150% of the diameter of one core 3 so as to hold the core 3a lying at the arrangement end. For this reason, the inserting tool 8 has no function of gripping the core 3. It should be noted, however, that the function of gripping the core 3 may be added, if desired.

When the core 3a detected by that detecting portion 7 as lying at the arrangement end is held by the inserting tool 8, the inserting tool 8 is moved downward by the cylinder. As shown in FIG. 5, the first blade 8a and the second blade 8b are being formed in such oblique shapes that contact areas between them and the core 3a lying at the arrangement end are increased with downward moving of the inserting tool 8. By forming the first blade 8a and the second blade 8b in this manner, even when the core 3a lying at the arrangement end is meandering with respect to the first blade 8a and the second blade 8b, the core 3a can be held therebetween while the meander of the core 3a lying at the arrangement end is being corrected, and even after the core 3a has been held, the orientation of the core 3a lying at the arrangement end can be controlled.

Further, the inserting tool 8 can be moved by an actuator (not shown) along the outer peripheral base 5, in other words, along the arranging direction of the plurality of cores 3. As shown in FIG. 5, with the core 3a lying at the arrangement end being held in the inserting tool 8, the inserting tool 8 is moved in the arranging direction of the plurality of cores 3, thereby being able to separate the core 3a lying at the arrangement end from the core 3b lying adjacent thereto. The plurality of cores 3 arranged in a single layer are being arranged in a limited range, and therefore, depending on the number of the cores 3, the spaces between adjacent ones 3 of the plurality of cores 3 are very short, or the plurality of cores 3 are tightly adhering to each other, and the plurality of cores 3 constitute the aggregated core cluster 4. Here, the role of the transferring mechanism 200 is to transfer the plurality of cores 3 to be aligned while separating them from the core cluster 4 that is the aggregation of the cores 3 by using the inserting tool 8.

(Aligning Mechanism)

The aligning mechanism 300 is configured to align and hold the plurality of cores 3 separated by the transferring mechanism 200 described above with a predetermined jig. Here, the aligning and holding refers to aligning the plurality of cores 3 at constant spaced intervals, and holding them in such a manner as to more tightly regulate free moving of the plurality of cores 3 than the temporary holding.

Figure 7:
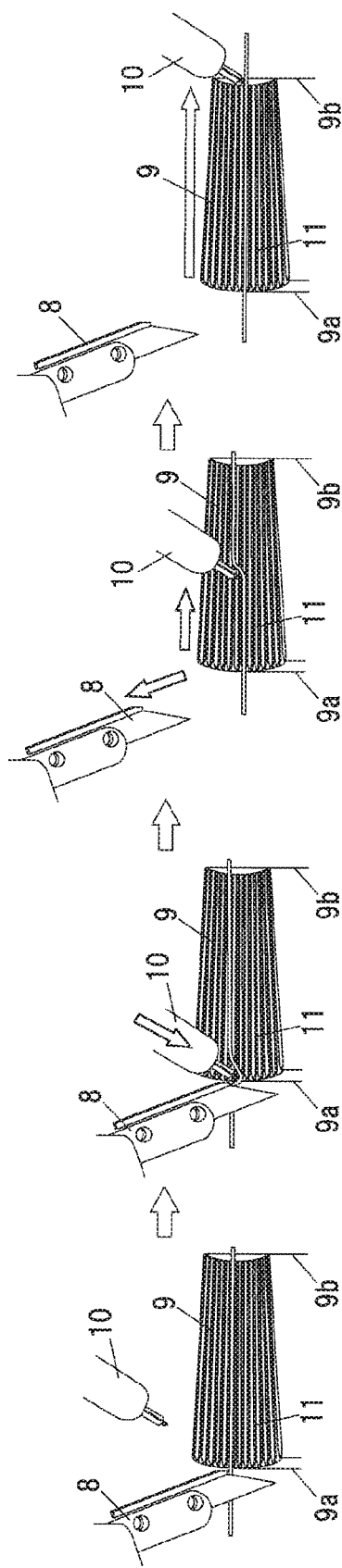
FIG. 7 is a diagram showing a configuration example of an aligning mechanism 300.
Figure 10:
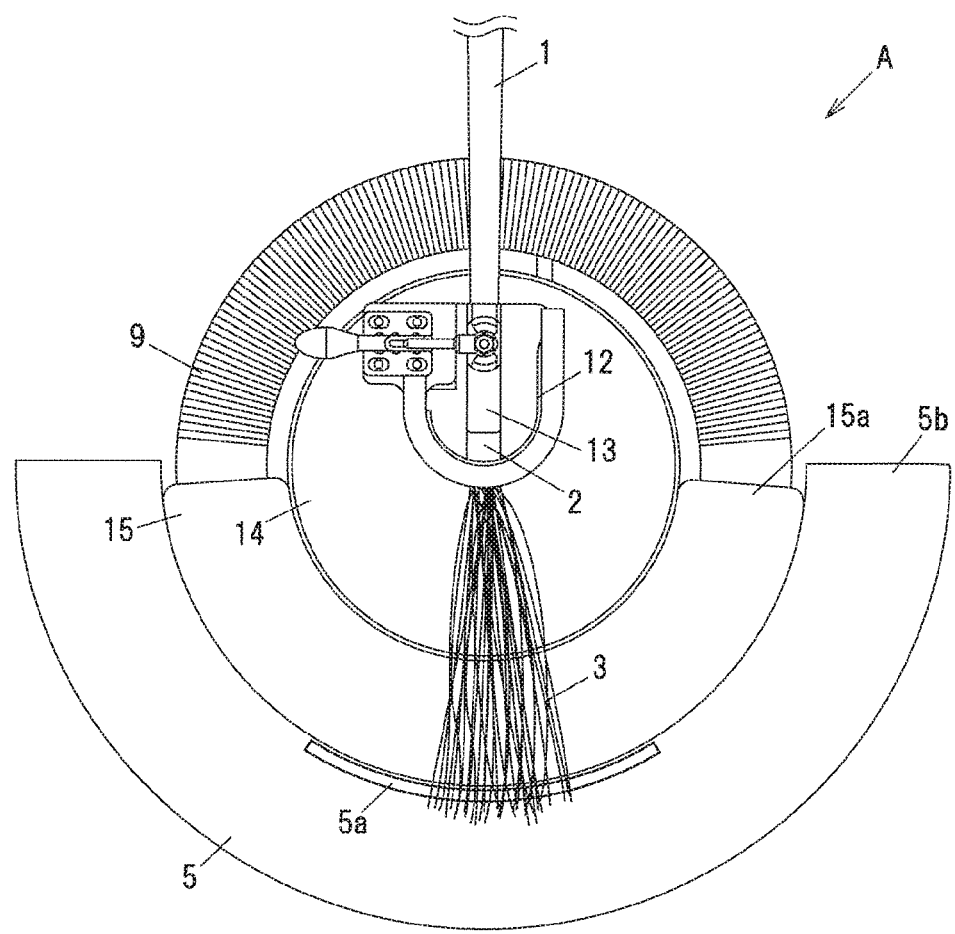
FIG. 10 is a diagram showing the multi-core cable core aligning device with a multicore cable 1 installed therein.

As shown in FIGS. 7 and 10, the aligning mechanism 300 is configured to include a circular arc shape aligning tool 9, which is being provided with a plurality of grooves 11 with a predetermined pitch, a pushing tool 10, which is configured to push the plurality of cores 3 into the plurality of grooves 11 of the aligning tool 9, and a circular arc shape preliminary setting-up base 15 having a flat upper surface 15a. The aligning tool 9 and the preliminary setting-up base 15 are being arranged in such a manner as to surround a circular disc shape central base 14, which is configured to fix the multicore cable 1 to that central base. The central base 14 is being provided with a cable fixing portion 12 to fix the multi-core cable 1 with a cable clamp 13.

In the present embodiment, the aligning tool 9 and the preliminary setting-up base 15 are both being formed in such substantially semicircular shapes, respectively, as to form a ring shape as a whole. The aligning tool 9 and the preliminary setting-up base 15 are being configured in such a manner as to be movable around, e.g. pivotably rotatable around, the central base 14 between the central base 14 and the outer peripheral base 5 in the circumferential direction thereof. In the present embodiment, the aligning tool 9 and the preliminary setting-up base 15 are being fixed to each other in such a manner that they are integrally moved around the central base 14.

The plurality of grooves 11 of the aligning tool 9 are extending radially from an inner diameter side end portion 9b of the aligning tool 9 to an outer diameter side end portion 9a. The pushing tool 10 is being connected to a cylinder (not shown), and as indicated by arrows in FIG. 7, the pushing tool 10 can be moved in forward and backward directions along the plurality of grooves 11 as well as in upward and downward directions.

Figure 8A:
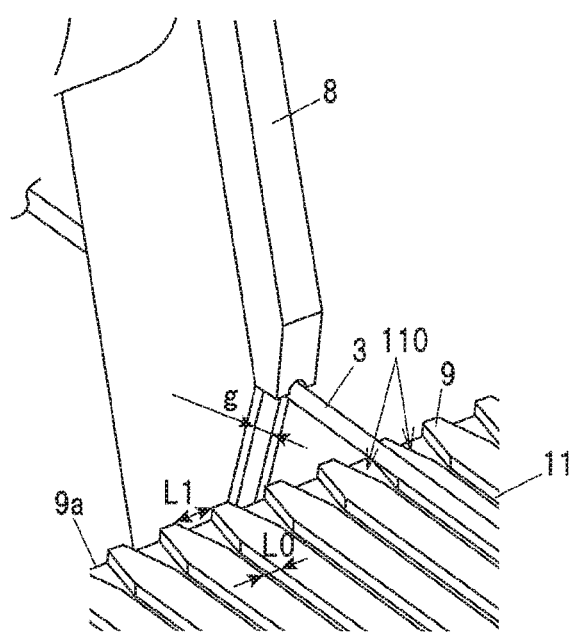
FIGS. 8A and 8B are schematic diagrams showing a process for pushing a part of one core 3 held in the inserting tool 8 into one of a plurality of grooves 11 of an aligning tool 9.
Figure 8B:
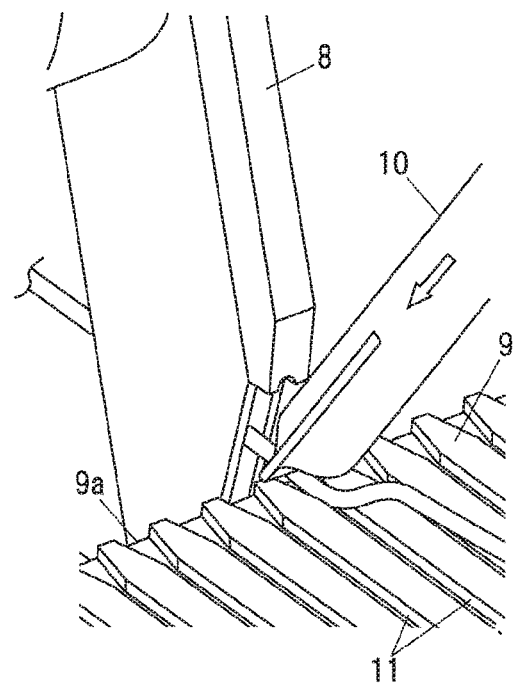

First, the aligning tool 9 will be described with reference to FIGS. 8A and 8B. FIGS. 8A and 8B are schematic diagrams showing such an operation as to push one core 3 of the plurality of cores 3 held in the inserting tool 8 into one groove 11 of the plurality of grooves 11 of the aligning tool 9 with the pushing tool 10, wherein in FIG. 8A there is shown that one core 3 before the pushing tool 10 is moved downward, and in FIG. 8B there is shown that one core 3 when the pushing tool 10 is being moved downward. As shown in FIG. 8A, aligning tool 9 end portion 9a sides of the plurality of grooves 11 are being provided with triangular notches 110 respectively.

Although the width of the gap g of the inserting tool 8 is 100% to 150% of the diameter of one core 3 as described above, a width of an opening diameter L1 of one triangular notch 110 is larger than the width of the gap g, and the width of the opening diameter L1 of one triangular notch 110 is being set at 200% of the diameter of one core 3. By configuring the width of the opening diameter L1 of one triangular notch 110 in this manner, when the pushing tool 10 pushes a region adjacent to the end portion 9a of the aligning tool 9, one part of the one core 3 held in the inserting tool 8 can securely be pushed into the one groove 11, as shown in FIG. 8B. Note that although in the present embodiment, a width L0 of one groove 11 is narrower than the diameter of one core 3, and is being set at around 95% of the diameter of one core 3 for example, the width L0 of one groove 11 is not limited to that of the present embodiment, but may appropriately be altered according to types of the cores 3 and the pushing tool 10.

After the one part of the one core 3 held in the inserting tool 8 is pushed into the one groove 11 in this manner, the inserting tool 8 is returned to the original position as shown in FIG. 7, and with the pushing tool 10 remaining moved downward, the pushing tool 10 is moved forward to the other end 9b of the aligning tool 9, thereby being able to insert and hold the one core 3 in the one groove 11. By configuring the pushing tool 10 in such a manner as to be movable downward and push the one part of the one core 3 into the one groove 11, even when the one core 3 is meandering, the one core 3 can be inserted along and in the one groove 11 without derailing from the one groove 11.

By repeating this procedure to hold the plurality of cores 3 in the plurality of grooves 11 respectively, the plurality of cores 3 are aligned and held. In other words, in the present embodiment, by press fitting the plurality of cores 3 into the plurality of grooves 11 respectively, the plurality of cores 3 are aligned and held without easily detaching from the plurality of grooves 11. Note that it is desirable that the frictional resistance of a tip of the pushing tool 10 against the plurality of cores 3 is smaller than the frictional resistance of the plurality of grooves 11 against the plurality of cores 3. To this end, in the present embodiment, the tip of the pushing tool 10 to be brought into contact with the plurality of cores 3 is being subjected to a coating operation with a PTFE resin having a low frictional resistance.

Next, a multi-core cable core aligning method in an embodiment of the present invention will be described in accordance with an operation procedure of the core aligning device A of the present embodiment.

Figure 9:
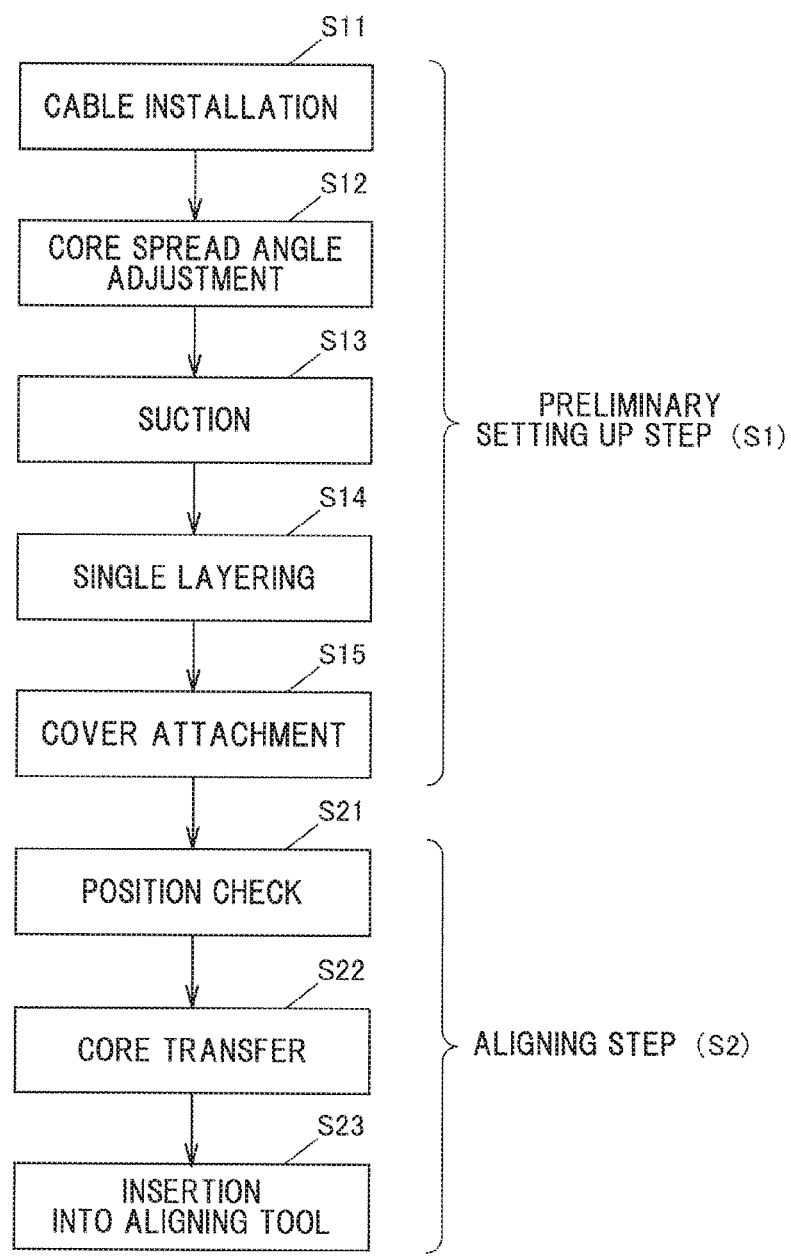
FIG. 9 is a flow diagram showing an entire process.

As shown in FIG. 9, a process flow in the present embodiment is configured to include a "preliminary setting-up step (S1)" of temporarily holding tip portions of the plurality of cores 3 with the tip portions of the plurality of cores 3 being arranged in a row in a single layer with no vertical overlap of the tip portions of the plurality of cores 3, and an "aligning step (S2)" of separating the plurality of cores 3 one by one and inserting them into the aligning tool 9, and by in turn performing these steps, all the cores 3 can be aligned and held while remaining arranged in a row with a predetermined space between adjacent ones of the cores 3. Details of each step will be described below.

(Preliminary Setting-Up Step)

In the present embodiment, first, the preliminary setting-up step (S1) is performed. In the preliminary setting-up step (S1), the multicore cable 1 is installed in the device, and a spread angle of the plurality of cores 3 is adjusted, and thereafter the tips of the cores 3 are arranged with no vertical overlap thereof, are sucked, and are mounted with the cover 6, thereby being temporarily held while remaining arranged in this manner. The preliminary setting-up step (S1) is performed with the preliminary setting-up base 15 being arranged between the central base 14 and the outer peripheral base 5.

A cable installation S11 refers to a sub-step in which the multi-core cable 1 is installed by being fixed to the central base 14. In this step, as shown in FIG. 10, the multicore cable 1 is installed in the cable fixing portion 12 on the central base 14 provided in a middle portion of the device. Here, a fixing position for the multi-core cable 1 is adjusted in such a manner that the tips of the plurality of cores 3 protrude from the suction portion Sa by a predetermined length. And the multi-core cable 1 is fixed by using the cable clamp 13 so that the multi-core cable 1 is not moved. A portion of the multicore cable 1 that is being covered with the sheath 2 is held with the cable clamp 13.

Figure 11:
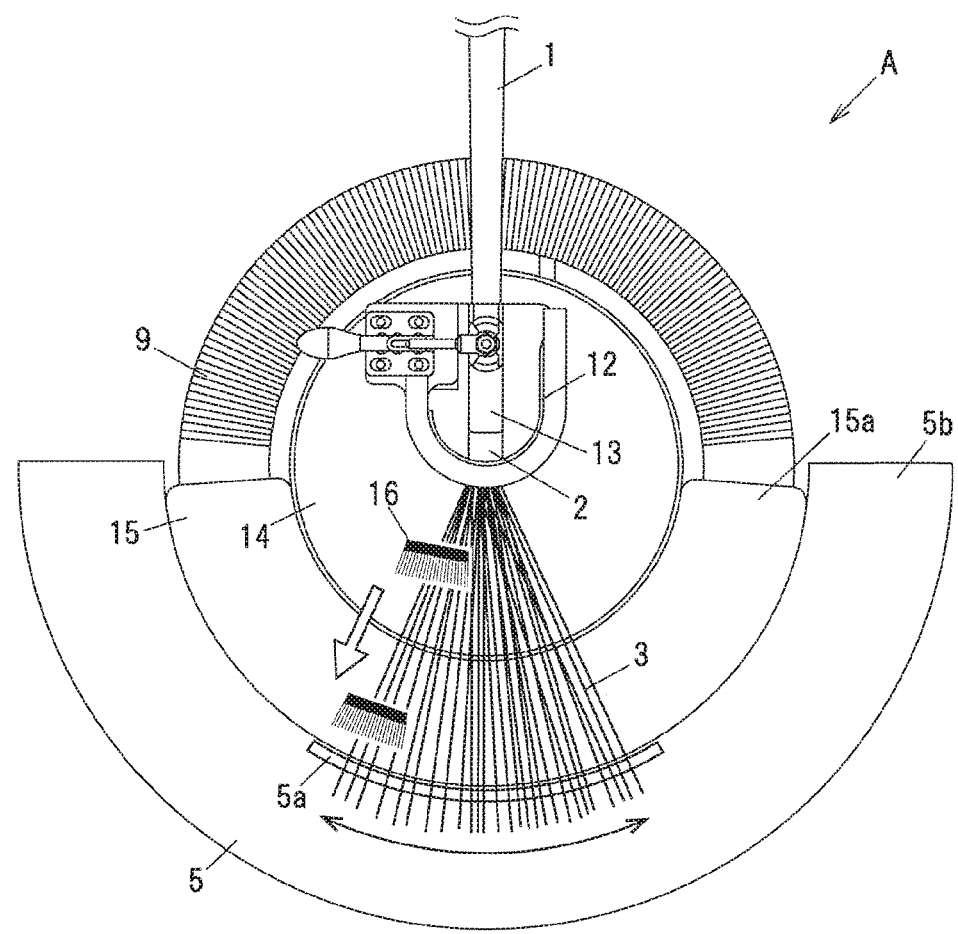
FIG. 11 is a diagram showing the multi-core cable core aligning device with an adjustment of a spread angle of cores 3 being performed therein.

Next, a spread angle adjustment S12 for the plurality of cores 3 is performed. The adjustment of the spread angle of the plurality of cores 3 refers to a sub-step of adjusting an angle at which the plurality of cores 3 are spread in the arranging direction thereof while unraveling a large overlap or tangle of cores 3 in the plurality of cores 3. The plurality of cores 3 are spread in such a manner as to form a fan shape with an end portion of the sheath 2 being located at its center. In this sub-step, as shown in FIG. 11, first, a brush 16 is moved downward to a base of the fixed multicore cable 1. Next, with the brush 16 remaining moved downward, the brush 16 is moved toward the tip portions of the cores 3.

This sub-step is performed not by performing the operation in one entire range of the plurality of cores 3, but by performing the operation in each of a plurality of small ranges of the plurality of cores 3. For example, the entire range of the plurality of cores 3 can be combed with the brush 16 by performing the operation in each of 10 small ranges of the plurality of cores 3 with the brush 16 having a width of 20 mm. In this manner, the degree of the large overlap or tangle of cores 3 in the plurality of cores 3 can be mitigated while the spread angle of the plurality of cores 3 is being adjusted to a predetermined angle.

Figure 12:
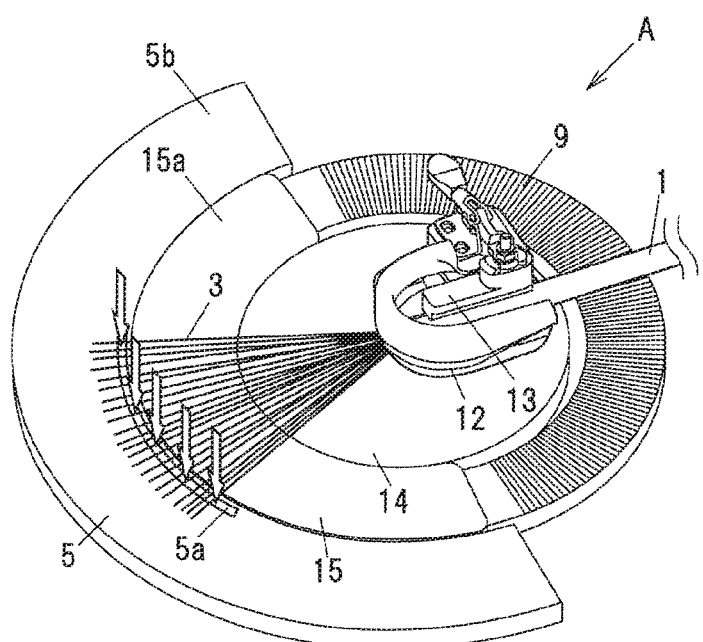

Next, suction S13 is performed. As shown in FIG. 12, when the suction in the suction portion 5a is started, the tips of the plurality of cores 3 are sucked to the outer peripheral base 5. In FIG. 12, a plurality of arrows denote a flow of air. This allows regulating the movements of the plurality of cores 3 brought into contact with the outer peripheral base 5, and stopping each of the plurality of cores 3 there. Note that, since the cores 3 may irregularly be tangled together at the stage of suction, it may not be possible to suck all the cores 3 to the outer peripheral base 5 by suction.

Next, a single layering operation S14 is performed. The single layering operation S14 refers to a sub-step in which the tips of the plurality of cores 3 arranged are single layered with no vertical overlap thereof by using the squeegee 17. That is, the tips of all the cores 3 are adhered tightly to the suction portion Sa. In this step, as shown in FIG. 13, first, the squeegee 17 is moved downward to a region adjacent to the base of the fixed multi-core cable 1 and a constant amount of load is applied to press the cores 3. This allows the cores 3 in part with the squeegee 17 brought into contact therewith to be single layered.

Subsequently, with the pressing force of the squeegee 17 being maintained, the squeegee 17 is moved toward the tips of the cores 3. In this manner, the single layered state can be transmitted up to the tips of the cores 3. Here, when the pressing force of the squeegee 17 is released, the cores 3 have a wire tendency to return to their original state again, but in the present embodiment, since the region adjacent to the tips of the cores 3 is sucked by the suction portion 5a, even when the pressing force of the squeegee 17 is released, the cores 3 can be maintained in the single layered state. Note that in the single layering operation with the squeegee 17, all the cores 3 are single layered not by performing the operation in one entire range of the plurality of cores 3, but by performing the single layering operation with the squeegee 17 in each of a plurality of small ranges of the plurality of cores 3.

As described above, in the present embodiment, the plurality of cores 3 arranged are single layered by using the squeegee 17. A reason for doing so will be further described.

Figure 14A:
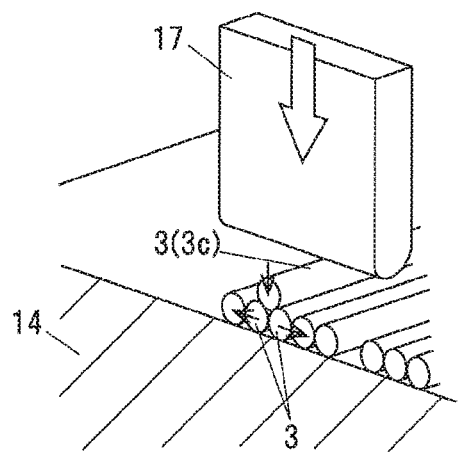
FIGS. 14A and 14B are schematic diagrams showing a single layering process whereby the cores 3 are single layered by being pressed by the squeegee 17.
Figure 14B:
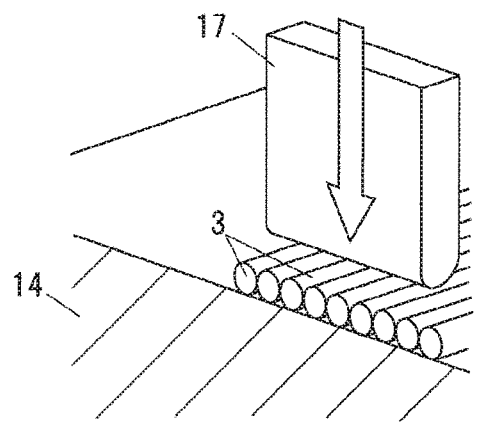

First, a reason for the cores 3 being single layered by pressing with the squeegee 17 will be described. FIGS. 14A and 14B are schematic diagrams showing a region adjacent to the base of the fixed multicore cable 1 to be single layered on the central base 14 by using the squeegee 17, wherein in FIG. 14A there is shown the squeegee 17 starting a pressing, and in FIG. 14B there is shown the squeegee 17 having performed that pressing. As shown in FIG. 14A, a core 3c of the plurality of cores 3 lying on a first layer is pressed downward in the figure by the squeegee 17, allowing the two cores 3 lying between the core 3c and the central base 14 to move apart from each other in the arranging direction of the cores 3, a space to form between those two cores 3, and the core 3c to enter that space. Thus, by the pressing with the squeegee 17 being completed, the cores 3 in the range pressed by the squeegee 17 are single layered, as shown in FIG. 14B.

In the present embodiment, the central base 14 and the squeegee 17 to be brought into contact with the cores 3 are made of a PTFE resin having a low friction resistance in order to reduce the friction resistance between them and the cores 3. Further, a tip of the squeegee 17 to be brought into contact with the cores 3 is rounded so as to be brought into point contact with the cores 3. By configuring the tip of the squeegee 17 in this manner, the cores 3 held between the central base 14 and the squeegee 17 can be moved in the arranging direction of the cores 3 with a small force, and the overlapping core 3c can easily be single layered.

Figure 15A:
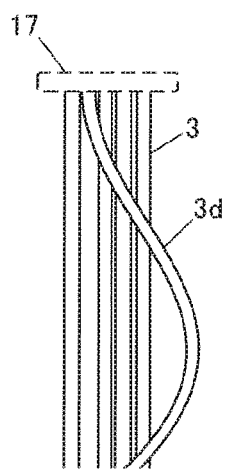
FIGS. 15A to 15C are diagrams showing a core meander correcting process whereby a meander in the cores 3 is corrected by moving the squeegee 17.
Figure 15B:
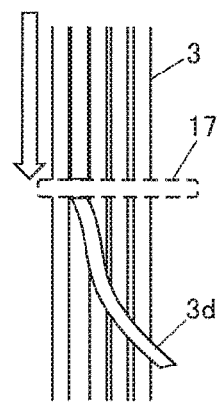
Figure 15C:
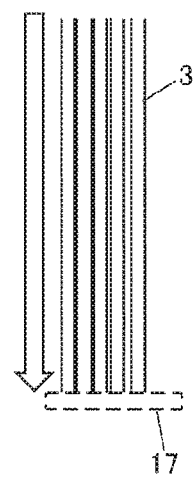

Next, a reason for the squeegee 17 being moved toward the tips of the cores 3 will be described. FIGS. 15A to 15C are schematic diagrams showing a process for moving the squeegee 17 from a portion with the multicore cable 1 being fixed thereto to the tips of the plurality of cores 3, wherein in FIG. 15A there is shown the squeegee 17 before being moved, and in FIG. 15B there is shown the squeegee 17 during being moved, and in FIG. 15C there is shown the squeegee 17 after being moved. As shown in FIG. 15A, when there is a core 3d of the plurality of cores 3 greatly meandering and overlapping other cores 3, by the squeegee 17 being moved in a direction indicated by arrows in FIGS. 15B and 15C, the single layered state can be transmitted to the tips of the cores 3 while the meander of the core 3d is being corrected. In this manner, by the squeegee 17 moving being completed, the meander is corrected and the tips of the cores 3 are single layered, as shown in FIG. 15C.

Note that, in the present embodiment, the upper surface 15a of the preliminary setting-up base 15 and the upper surface 5b of the outer peripheral base 5 with the squeegee 17 to be brought into contact therewith are being subjected to a coating operation with a PTFE resin having a low frictional resistance, in order to reduce the frictional resistance between them and the cores 3. This makes it possible for the cores 3 held between the squeegee 17 and the upper surface 15a of the preliminary setting-up base 15 and the upper surface 5b of the outer peripheral base 5 to be moved in the arranging direction of the cores 3 with a small force, and even when the meandering core 3d is present, the meander can easily be corrected.

Although as described above, in the present embodiment, the aligning tool 9 and the preliminary setting-up base 15 have a ring shape as a whole, the shape of the aligning tool 9 and the preliminary setting-up base 15 is not limited thereto, but the aligning tool 9 and the preliminary setting-up base 15 may have a circular arc shape as a whole. Further, in order to ensure the space for radially arranging a large number of cores 3, the aligning tool 9 may be longer in length in the circumferential direction than the preliminary setting-up base 15.

The aligning tool 9 and the preliminary setting-up base 15 are integrally rotationally moved (pivotally rotated) in a predetermined angle range in the same direction around the central base 14 by a motor (not shown). In order that, during this rotational movement (rotation), the cores 3 are not caught by the protrusion between the grooves 11 in the aligning tool 9, as shown in FIG. 4, a height of the aligning tool 9 (a height of a protrusion between the grooves 11) is set to be lower than the cores 3 on the upper surface 5b of the outer peripheral base 5, the upper surface 15a of the preliminary setting-up base 15 and the central base 14. In the preliminary setting-up step (S1), the cores 3 are arranged in a substantially fan shape on the preliminary setting-up base 15 and thereafter rearranged on the aligning tool 9 radially at equal spaced intervals by the rotational movement (rotation) of the preliminary setting-up base 15 and the aligning tool 9.

Figure 21:
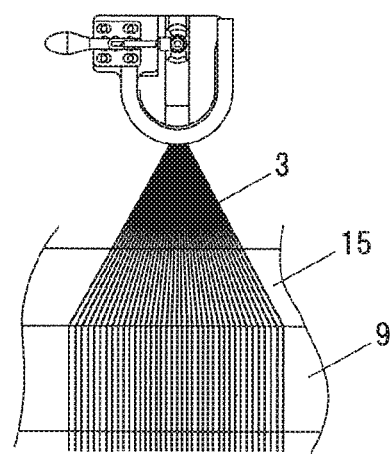
FIG. 21 is a schematic diagram showing a comparative example showing an arrangement of the cores 3 with the aligning tool 9 being not in a circular arc shape but in a linear shape.

Here, FIG. 21 is a schematic diagram showing a comparative example showing an arrangement of the cores 3 when the aligning tool 9 is not in a circular arc shape but in a straight line shape (straight strip shape). In this arrangement, it is necessary to move the aligning tool 9 and the preliminary setting-up base 15 on a straight line parallel to the arranging direction of the cores 3, which leads to an increase in device size in a horizontal direction. Further, when the cores 3 are arranged as shown in FIG. 21, if the number of the cores 3 is increased, it is necessary to increase the removal amount of the sheath 3 to expose the cores 3 long, which leads to an increase in the cable length and an increase in the cost. That is, as in the present embodiment, by forming the outer peripheral base 5 and the preliminary setting-up base 15 in a circular arc shape, it is possible to contribute to a decrease in the device size and a decrease in the cable length.

Next, a cover attachment S15 is performed. In this step, as shown in FIG. 3, a cover 6 is mounted in such a manner as to sandwich the tips of the cores 3 single layered by suction with the suction portion Sa between the cover 6 and the outer peripheral base 5. After the cover 6 is attached, as shown in FIG. 16, the positional relationship between the preliminary setting-up base 15 and the aligning tool 9 is altered so that the aligning tool 9 is arranged directly under the core cluster 4 arranged in a single layer.

(Aligning Step)

An aligning step (S2) is performed following the preliminary setting-up step (S1). The aligning step (S2) is a step in which the plurality of cores 3 arranged in a row in a single layered state are separated one by one and are aligned with the aligning tool 9 at spaced intervals.

Figure 17:
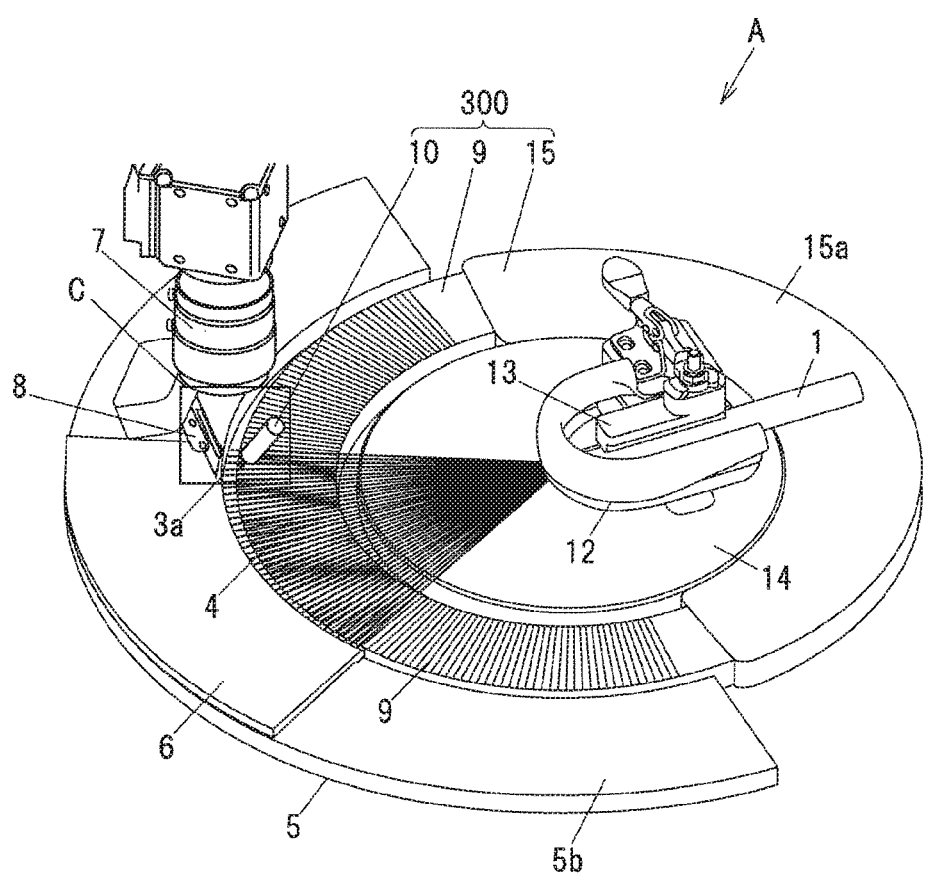
FIG. 17 is a diagram showing a measurement range of a detecting portion 7.
Figure 18:
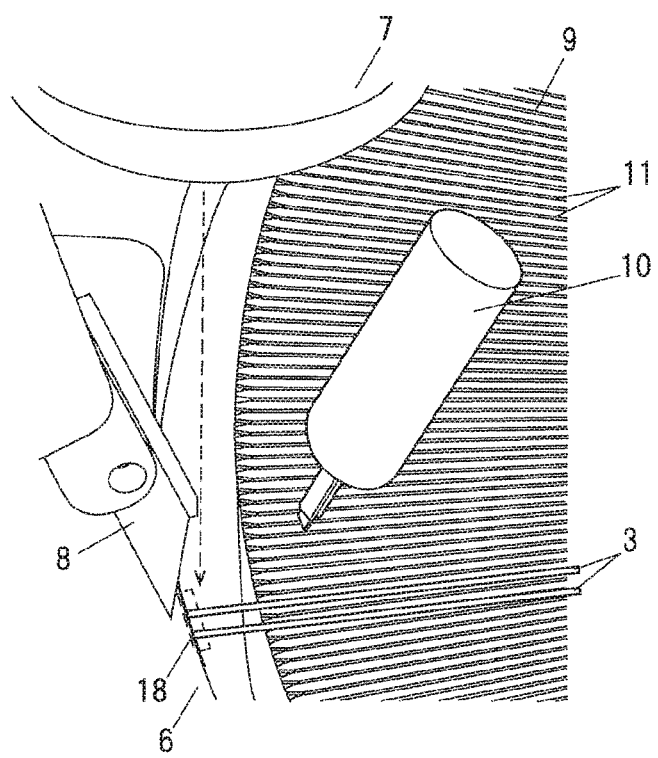
FIG. 18 is a partially enlarged view of a portion C in FIG. 17.

First, a position checking S21 for the cores 3 is performed. In this step, in order to separate one core 3 to be aligned from the core cluster 4 arranged in a single layer, the position of the core 3a lying at the arrangement end is detected by using the detecting portion 7. More specifically, as shown in FIG. 17, the detecting portion 7 is moved so that the arrangement end of the core clusters 4 are viewed in a view field of the detecting portion 7, and the position information of the core 3a at the arrangement end is detected. Since the cores 3 of the core cluster 4 tend to be overlapped vertically due to meander with increasing distance from the cover 6, a measurement range 18 to perform a detection is set in a region adjacent to the cover 6 as shown in FIG. 18. By configuring the detecting portion 7 in this manner, it is possible to detect the positional information on the plurality of cores 3 being arranged in a single layer. In the present embodiment, the measurement range 18 of the detecting portion 7 is being set at a position of 1 mm from the cover 6.

Figure 19:
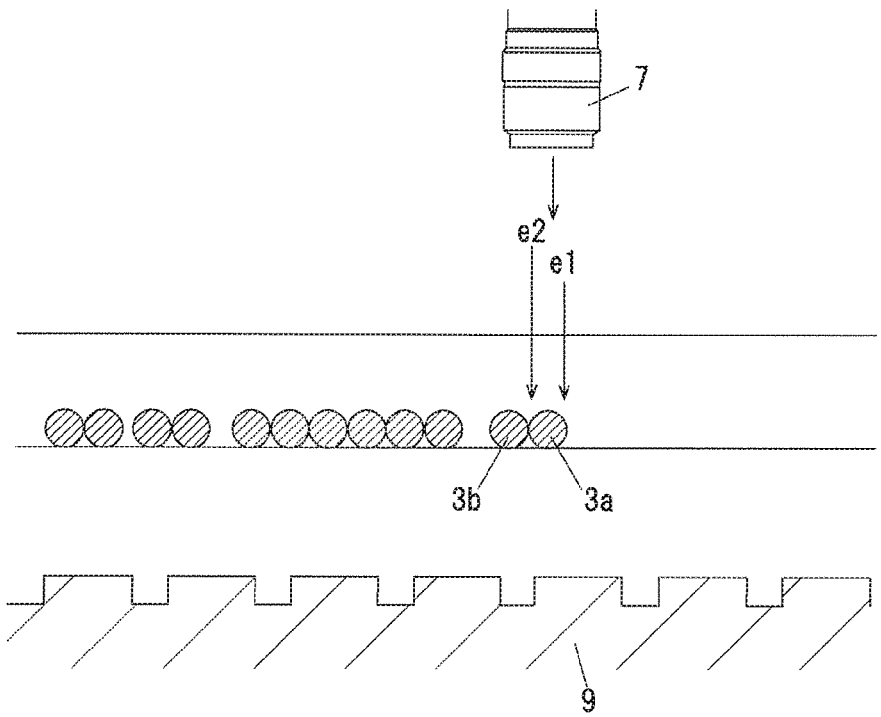
FIG. 19 is a schematic diagram showing a detecting method with the detecting portion 7.

A detection of the core 3a lying at the arrangement end by using the detecting portion 7 will be described with reference to FIG. 19. FIG. 19 is a schematic diagram illustrating a detection with the detecting portion 7 with the core 3b lying adjacent to the core 3a lying at the arrangement end tightly adhering to each other with no space therebetween. First, with the detecting portion 7 an edge e1 of the core 3a lying at the arrangement end is detected, and a computer processing to add diameter information on the core 3 to the detection result is performed, and the computing result is set as a position of an edge e2. That is, for the core 3a lying at the arrangement end, the adjacent core 3b side edge position is detected. In this manner, even when the core 3a lying at the arrangement end and the core 3b lying adjacent thereto are in contact with each other with no space therebetween as shown in FIG. 19, the edge position e2 of the adjacent core 3b can be set.

Figure 20:
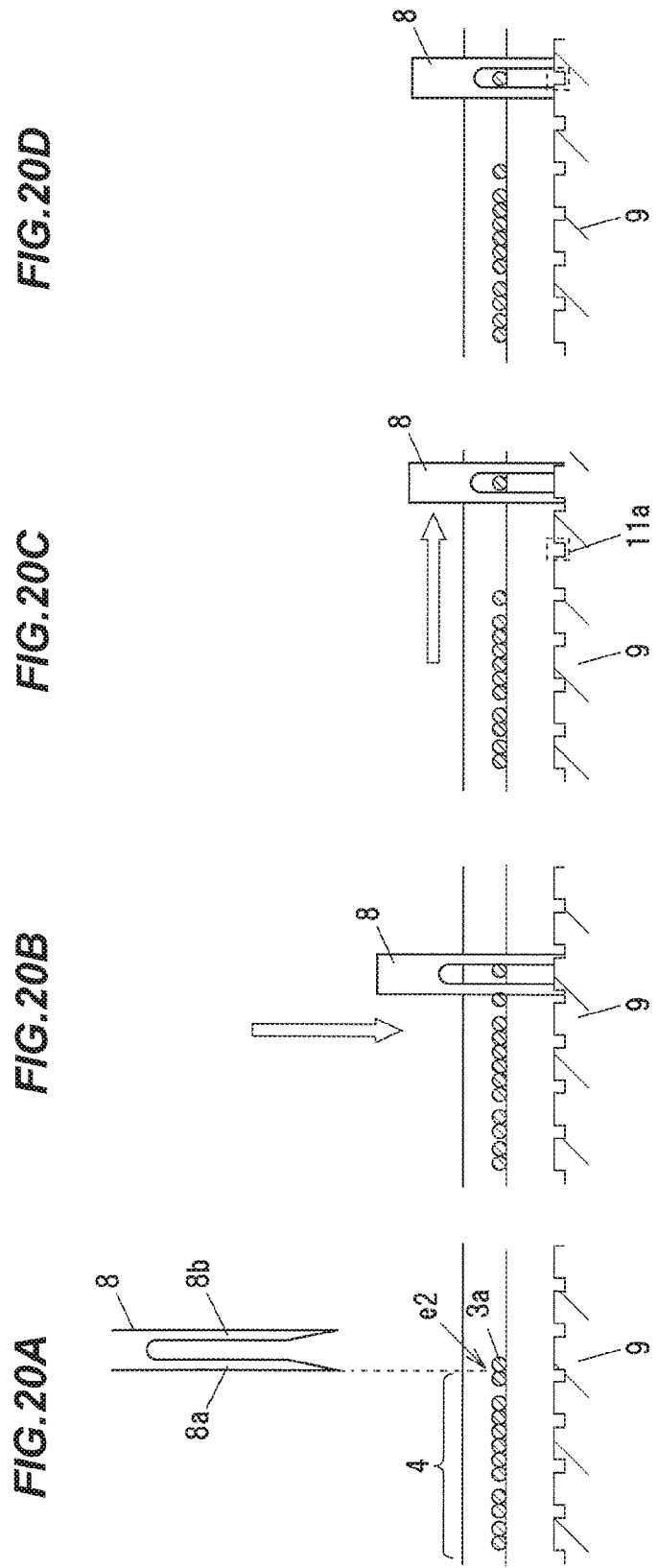
FIGS. 20A to 20D are schematic diagrams showing a core 3 transferring process with a core 3 being held in the inserting tool 8.

Next, a transferring S22 of the core 3a lying at the arrangement end is performed. In this step, on the basis of the detection result detected by that detecting portion 7, the core 3a at the arrangement end to be aligned is separated from the core cluster 4 by using the inserting tool 8. That is, as shown in FIGS. 20A to 20C, the inserting tool 8 is moved downward to the position of the computing result e2 obtained in the detecting portion 7, and the core 3a lying at the arrangement end is held in the inserting tool 8. Next, by the inserting tool 8 being moved with the core 3a at the arrangement end remaining held therein, the core 3a at the arrangement end can be separated from the core cluster 4.

Next, an insertion S23 of the separated core 3a into the aligning tool 9 is performed. First, as shown in FIGS. 20C and 20D, after the core 3a lying at the arrangement end is separated and transferred, the aligning tool 9 is moved to allow an insertion target groove 11a of the aligning tool 9 to come directly under the core 3a. Next, by moving the pushing tool 10 according to the procedure shown in FIG. 7, the core 3a can be inserted into the insertion target groove 11a. Here, the insertion target groove 11a refers to one groove 11 of the plurality of grooves 11 for the core 3a to be inserted in. In this manner, in the aligning step (S2), after the core 3a is pushed into that one groove 11, the operation to rotationally move (rotate) the aligning tool 9 by a predetermined angle is repeatedly performed.

By continuously performing the above described aligning step (S2) on each core 3, all the cores 3 arranged in a row in a single layered state in the preliminary setting-up step (S1) can be aligned and held with a predetermined space between adjacent ones thereof. Further, it is possible to program these operations and configure an automatic device which batch controls these operations with a computer and the like.

Note that, with the plurality of cores 3 remaining aligned as described above, the multi-core cable 1 is subjected to a predetermined termination process on each one of the plurality of cores 3. This termination process refers to a process such that, when the cores 3 are insulated electric wires, their insulating coating is removed to expose a central conductor for example, or when the cores 3 are coaxial cables, their inner conductor and their outer conductor are separated and exposed in their longitudinal direction, for example.

Second Embodiment

Next, an operation example of an aligning mechanism 300 according to a second embodiment will be described with reference to FIGS. 22A to 22C. In the present embodiment, an improvement is made to the operations of the inserting tool 8 and the aligning tool 9 described with reference to FIGS. 20A to 20D.

FIG. 22A is a diagram showing a clockwise direction (CW direction) and a counterclockwise direction (CCW direction), which are rotational moving directions of the inserting tool 8 and the aligning tool 9. FIG. 22B is a diagram illustrating an inserting tool 8 moving in the counterclockwise (CCW direction) when viewed from the central base 14.

FIG. 22C is a diagram showing an inserting tool 8 moving in the clockwise direction (CW direction) and an aligning tool 9 moving in the clockwise direction (CW direction) and the counterclockwise direction (CCW direction) when viewed from the central base 14. Note that, in FIGS. 22B and 22C, the right direction in the figure corresponds to the clockwise direction (CW direction), and the left direction in the figure corresponds to the counterclockwise direction (CCW direction).

The inserting tool 8 is configured in such a manner that it is repeatedly rotationally moved, and as shown in FIG. 22B, is rotationally moved in the counterclockwise direction (CCW direction) to separate and pick up the core 3a lying at the arrangement end from the other cores 3, and as shown in FIG. 22C, is rotationally moved in the clockwise direction (CW direction) to move the picked up core 3a to a position (hereinafter referred to as the predetermined position P) over the insertion target groove 11a of the aligning tool 9. The rotational moving of the inserting tool 8 in the counterclockwise direction (CCW direction) is executed as a return operation to approach the core 3a detected by the detecting portion 7, and the rotational moving of the inserting tool 8 in the clockwise direction (CW direction) is executed as a delivery operation to move the picked up core 3a over the insertion target groove 11a.

On the other hand, the aligning mechanism 300 is configured in such a manner that, during a period of time during which the core 3a is held in the insertion target groove 11a and the next core 3b is held in a groove 11b lying adjacent to the insertion target groove 11a, the aligning mechanism 300 moves (rotates) the aligning tool 9 in one direction (CW direction) around the central base 14 by a first predetermined angle, and thereafter moves (rotates) the aligning tool in the other direction (CCW direction) around the central base 14 by a second predetermined angle smaller than the first predetermined angle. The first predetermined angle is e.g. 1.0°. The second predetermined angle is e.g. 0.1°. This results in a rotational movement (rotation) of the aligning tool 9 in the clockwise direction (CW direction) by a difference (0.9° in the above example) between the first predetermined angle and the second predetermined angle.

The inserting tool 8 holds the first core 3a shown in FIG. 22B and is moved to the predetermined position P in the clockwise direction (CW direction) as shown in FIG. 22C. Next, the inserting tool 8 inserts the core 3a into the insertion target groove 11a, and the inserting tool 8 is moved counterclockwise in order to hold the next core 3b. Next, the inserting tool 8 holds the next core 3b at the arrangement end that is the second core, and the inserting tool 8 is again moved in the clockwise direction (CW direction) to the predetermined position P. The inserting tool 8 repeats this operation.

Here, when the inserting tool 8 holds the first core 3a and is moved in the clockwise direction (CW direction), the core 3b lying adjacent to the held core 3a may be moved in position along with the core 3a. In particular, when, with the core 3b being tangled with the core 3a, the inserting tool 8 is moved in the clockwise direction (CW direction), the adjacent core 3b is also pulled in the same direction.

In this case, since the distance L between the position where the second core 3b is picked up and the predetermined position P is shortened, the operation time to move the second core 3b to the predetermined position P is shortened, and when the moving of the inserting tool 8 is faster than the movement of the aligning tool 9, the blade 8b of the inserting tool 8 may collide with the first core 3a, and the first core 3a may come out of the groove 11a.

For this reason, after the first core 3a is inserted into the groove 11a, the aligning tool 9 is operated in such a manner as to be rotationally moved (rotated) in the clockwise direction by a predetermined angle (e.g. 1.0°) until the groove 11b for the second core 3b to be inserted in passes a position beneath the predetermined position P once, and be thereafter returned counterclockwise by a second predetermined angle (e.g. 0.1°) that is smaller than the first predetermined angle.

As described above, the rotation control for the aligning tool 9 is not performed as one rotational moving of e.g. 0.9°, but is performed as two rotational movings in the clockwise direction (CW direction) and the counterclockwise direction (CCW direction). That is, the aligning tool 9 is save controlled in the clockwise direction (CW direction) to avoid a collision between the cores 3 being already put in the grooves 11 and the inserting tool 8, and after this save control, the aligning tool 9 is moved in the counterclockwise direction (CCW direction) while being movement controlled so that the groove 11b is located at the set position.

As a result, during the rotational movement of the aligning tool 9 after the insertion of the core 3a into the groove 11a, the core 3a can promptly come out of the range in which the interference with the inserting tool 8 holding the core 3b therein occurs, and the subsequent rotational movement (rotation) of the aligning tool 9 in the counterclockwise direction (CCW direction) can result in a positioning of the groove 11b in a position beneath the predetermined position P. Further, since the inserting tool 8 and the aligning tool 9 approach each other toward the predetermined position P, the time required for positioning the groove 11b for the next core 3b to be inserted in can be shortened.

Operation and Effect of the Embodiment

As described above, the multi-core cable core aligning device according to the present embodiment is configured to include the temporary holding mechanism configured to arrange tips of a plurality of highly flexible cores exposed at one end of a multi-core cable in a row, and temporarily hold the plurality of cores in such a manner as to be movable along the arranging direction of the plurality of cores, the transferring mechanism configured to transfer the plurality of cores held by the temporary holding mechanism in the arranging order of the plurality of cores, and the aligning mechanism configured to align and hold the plurality of cores transferred by the transferring mechanism with a predetermined space between adjacent ones of the plurality of cores. As a result, even in the case of the highly flexible cores, it is possible to separate and transfer the cores one by one from the core cluster which is an aggregation of the plurality of cores, and arrange the cores in a row. Further, it is possible to achieve the multi-core cable core aligning device which is able to automate the operation to separate and align the plurality of cores.

In addition, the multi-core cable core aligning method according to the present embodiment is configured to include the preliminary setting-up step of fixing a multi-core cable, adjusting the arranging direction of the plurality of cores, sucking the tips of the cores, arranging the cores in a row and temporarily holding the cores, and the aligning step of detecting one of the plurality of cores lying at the arrangement end with the detecting portion, transferring and separating that one of the plurality of cores lying at the arrangement end from other ones of the plurality of cores with the inserting tool, and pushing that one of the plurality of cores lying at the arrangement end into a groove of the aligning tool configured to be able to hold that one of the plurality of cores lying at the arrangement end in that groove. As a result, even in the case of the highly flexible cores, it is possible to separate and transfer the cores one by one from the core cluster which is an aggregation of the plurality of cores, and arrange the cores in a row. Further, it is possible to achieve the multi-core cable core aligning device which is able to automate the operation to separate and align the plurality of cores.

Although the multi-core cable core aligning device and multi-core cable core aligning method according to the present invention have been described above using the embodiments, the present invention is not limited to the above-described embodiments. The contents thereof can be altered within the technical scope defined in the appended claims.

For example, although, in the embodiments, only the tips of the cores 3 are sucked in the suction portion Sa, the suction portion may also be provided in the central base 14 and the preliminary setting-up base 15 to widen the range in which the cores 3 are to be prevented from movement.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A multi-core cable core aligning device, comprising:
a temporary holding mechanism, which is configured to arrange tips of a plurality of cores exposed at one end of a multi-core cable in a row along a predetermined arranging direction, and temporarily hold each one of the plurality of cores in such a manner as to be movable along the predetermined arranging direction;
a transferring mechanism including an inserting tool comprising a plurality of blades formed with a gap, which is configured to transfer the plurality of cores one by one while the inserting tool separates the plurality of cores held by the temporary holding mechanism one by one from other ones of the plurality of cores; and
an aligning mechanism, which is configured to align and hold the plurality of cores with a predetermined space between adjacent ones of the plurality of cores while holding the plurality of cores transferred by the transferring mechanism one by one at spaced intervals,
wherein the aligning mechanism comprises an aligning tool, which is provided with a plurality of grooves with a predetermined pitch, wherein the aligning tool is able to hold the plurality of cores one by one in the plurality of grooves, and
further comprising: a central base, to which the multi-core cable is to be fixed, wherein the aligning tool has a circular arc shape arranged over an outer periphery of the central base, and is configured in such a manner as to be rotatable around the outer periphery of the central base.

2. The multi-core cable core aligning device according to claim 1, wherein the transferring mechanism comprises a detecting portion, which is configured to detect one of the plurality of cores being temporarily held by the temporary holding mechanism and lying at an arrangement end, wherein the transferring mechanism transfers the plurality of cores in order from that one of the plurality of cores lying at the arrangement end, on the basis of a detection result detected by that detecting portion.

3. The multi-core cable core aligning device according to claim 2, wherein the inserting tool is configured to be inserted between one of the plurality of cores lying at the arrangement end and one of the plurality of cores lying adjacent to that one of the plurality of cores lying at the arrangement end, wherein the transferring mechanism transfers one of the plurality of cores lying at the arrangement end by moving the inserting tool relative to the plurality of cores.

4. The multi-core cable core aligning device according to claim 1,
wherein the aligning mechanism further comprises a pushing tool adapted to push the plurality of cores one by one into the plurality of grooves, wherein the aligning mechanism aligns and holds the plurality of cores, which are in turn being transferred over the plurality of grooves by the transferring mechanism and pushed into the plurality of grooves by the pushing tool.

5. The multi-core cable core aligning device according to claim 1,
wherein the aligning mechanism is configured in such a manner that, during a period of time during which one of the plurality of cores is held in any one of the plurality of grooves and a next one of the plurality of cores is held in the other one of the plurality of grooves adjacent to the one of the plurality of grooves, the aligning mechanism moves the aligning tool in one direction around the outer periphery of the central base by a first predetermined angle, and thereafter moves the aligning tool in the other direction around the outer periphery of the central base by a second predetermined angle smaller than the first predetermined angle.

6. A multi-core cable core aligning method for arranging tips of a plurality of cores exposed at one end of a multi-core cable in a row along a predetermined arranging direction, and align and hold the plurality of cores with a predetermined space between adjacent ones of the plurality of cores, the method comprising:

a preliminary setting-up step of arranging the plurality of cores in a row along a predetermined arranging direction, and temporarily holding each one of the plurality of cores in such a manner as to be movable along the predetermined arranging direction; and an aligning step of moving one of the plurality of cores lying at an arrangement end with an inserting tool comprising a plurality of blades formed with a gap, to thereby separate that one of the plurality of cores from other ones of the plurality of cores, and using the inserting tool to push that one of the plurality of cores into a groove of an aligning tool configured to be able to hold that one of the plurality of cores lying at the arrangement end in that groove, wherein the aligning tool has a circular arc shape arranged on an outer periphery of a central base, to which the multi-core cable is to be fixed, wherein, in the aligning step, after the one of the plurality of cores lying at the arrangement end is pushed into the groove of the aligning tool, the aligning tool is repeatedly moved around the outer periphery of the central base by a predetermined angle.

7. The multi-core cable core aligning method according to claim 6, wherein the preliminary setting-up step is performed in such a manner as to suck and temporarily hold the tips of the plurality of cores.

8. The multi-core cable core aligning method according to claim 6, wherein the aligning step is performed in such a manner as to optically detect the one of the plurality of cores lying at the arrangement end with a detecting portion.

9. The multi-core cable core aligning method according to claim 6, wherein the aligning step is performed in such a manner that, during a period of time during which one of the plurality of cores is held in any one of the plurality of grooves and a next one of the plurality of cores is held in the other one of the plurality of grooves adjacent to that one of the plurality of grooves, the aligning tool is moved in one direction around the outer periphery of the central base by a first predetermined angle, and thereafter the aligning tool is moved in the other direction around the outer periphery of the central base by a second predetermined angle smaller than the first predetermined angle.

\* \* \* \* \*